(12) United States Patent
Fichtinger et al.

(10) Patent No.: US 11,007,956 B2
(45) Date of Patent: May 18, 2021

(54) BUMPER ARRANGEMENT FOR THE FRONT REGION OF A PASSENGER CAR

(71) Applicant: Bayerische Motoren Werke Aktiengesellschaft, Munich (DE)

(72) Inventors: Gerhard Fichtinger, Grasbrunn (DE); Martin Gross, Ottershausen Haimhausen (DE); Mazdak Novine, Munich (DE); Tim Rudolph, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 68 days.

(21) Appl. No.: 16/448,645

(22) Filed: Jun. 21, 2019

(65) Prior Publication Data

US 2019/0308577 A1    Oct. 10, 2019

Related U.S. Application Data

(63) Continuation of application No. PCT/EP2017/084001, filed on Dec. 21, 2017.

(30) Foreign Application Priority Data

Dec. 22, 2016  (DE) .................... 10 2016 226 093.6

(51) Int. Cl.
  *B60R 19/18*  (2006.01)
  *B60R 19/12*  (2006.01)
  *B60R 21/34*  (2011.01)
(52) U.S. Cl.
  CPC .............. *B60R 19/18* (2013.01); *B60R 19/12* (2013.01); *B60R 21/34* (2013.01); *B60R 2019/186* (2013.01)

(58) Field of Classification Search
  CPC ... B60R 19/18; B60R 2019/186; B60R 19/12; B60R 21/34
  (Continued)

(56) References Cited

U.S. PATENT DOCUMENTS 4,542,925 A     9/1985  Huber et al.
6,540,275 B1 *  4/2003  Iwamoto ................ B60R 19/12
                                                  293/109

(Continued)

FOREIGN PATENT DOCUMENTS

DE    101 00 875 A1    7/2002
DE    101 37 911 A1    1/2003
(Continued)

OTHER PUBLICATIONS

International Search Report (PCT/ISA/210) issued in PCT Application No. PCT/EP2017/084001 dated Mar. 2, 2018 with English translation (six (6) pages).

(Continued)

*Primary Examiner* — Joseph D. Pape
(74) *Attorney, Agent, or Firm* — Crowell & Moring LLP

(57) ABSTRACT

A bumper arrangement of a passenger car has an upper and a lower load path. A spring element is provided on the transverse support of the lower load path, which, in the event of a collision of a pedestrian with the passenger car, exerts an additional force on the lower leg of the pedestrian, so as to support the movement of the pedestrian in the direction of the front hood of the passenger car.

18 Claims, 7 Drawing Sheets

(58) Field of Classification Search
USPC .......................... 296/187.04; 293/102, 120
See application file for complete search history.

(56) References Cited

U.S. PATENT DOCUMENTS

| | | | |
|---|---|---|---|
| 7,959,197 B2* | 6/2011 | Agrahari | B60R 19/34 |
| | | | 293/102 |
| 8,403,403 B2* | 3/2013 | Tashiro | B60R 21/34 |
| | | | 296/187.09 |
| 10,144,386 B2* | 12/2018 | Makowski | B60R 21/34 |
| 2004/0160071 A1* | 8/2004 | Suganuma | B60R 19/12 |
| | | | 293/132 |
| 2011/0227353 A1 | 9/2011 | Nagwanshi et al. | |
| 2012/0161473 A1 | 6/2012 | Schaefer | |
| 2015/0158445 A1 | 6/2015 | Sogabe et al. | |

FOREIGN PATENT DOCUMENTS

| | | |
|---|---|---|
| DE | 102 32 321 A1 | 2/2004 |
| DE | 10 2004 030 794 A1 | 1/2006 |
| DE | 10 2008 038 062 B3 | 6/2010 |
| DE | 10 2010 056 390 A1 | 6/2012 |
| DE | 10 2014 016 044 A1 | 5/2016 |
| EP | 1 273 483 A2 | 1/2003 |
| WO | WO 2014/154630 A1 | 10/2014 |
| WO | WO 2016/189140 A1 | 12/2016 |

OTHER PUBLICATIONS

German-language Written Opinion (PCT/ISA/237) issued in PCT Application No. PCT/EP2017/084001 dated Mar. 2, 2018 (five (5) pages).
German-language Search Report issued in counterpart German Application No. 102016226093.6 dated Oct. 24, 2017 with partial English translation (14 pages).
International Search Report (PCT/ISA/210) issued in PCT Application No. PCT/EP2017/084003 dated Mar. 3, 2018 with English translation (four (4) pages).
German-language Written Opinion (PCT/ISA/237) issued in PCT Application No. PCT/EP2017/084003 dated Mar. 3, 2018 (five (5) pages).
German-language Search Report issued in counterpart German Application No. 102016226096.0 dated Oct. 27, 2017 with partial English translation (14 pages).

* cited by examiner

BUMPER ARRANGEMENT FOR THE FRONT REGION OF A PASSENGER CAR

CROSS REFERENCE TO RELATED APPLICATIONS

This application is a continuation of PCT International Application No. PCT/EP2017/084001, filed Dec. 21, 2017, which claims priority under 35 U.S.C. § 119 from German Patent Application No. 10 2016 226 093.6, filed Dec. 22, 2016, the entire disclosures of which are herein expressly incorporated by reference.

This application contains subject matter related to U.S. application Ser. No. 16/448,631, entitled "Bumper Arrangement for the Front Region of a Passenger Car" filed on even date herewith.

BACKGROUND AND SUMMARY OF THE INVENTION

The invention relates to a bumper arrangement for the front region of a passenger car and to a passenger car having such a bumper arrangement.

A bumper arrangement of the type in question is known for example from WO 2014/154630 A1. The known bumper arrangement has an upper and a lower load path. The upper load path is formed by upper longitudinal members and an upper crossmember and, in the event of a collision of the passenger car, bears the main part of the energy reduction. The lower load path is formed by lower longitudinal members and a lower crossmember. The lower crossmember is usually also known as a "lower stiffener" or as a "lower bumper stiffener". The two crossmembers are covered by a bumper cover. The lower crossmember serves to stiffen the bumper cover in its lower region in particular when subjected to a force by a pedestrian as a result of an accident. In the event of a pedestrian's lower leg colliding with the bumper cover, the lower crossmember causes the pedestrian to be moved onto the hood of the passenger car in a manner accelerated by an appropriate force and thus in a defined manner in the region of his lower leg.

The object of the invention is to further develop the known bumper arrangement.

This and other objects are achieved by a bumper arrangement, and a vehicle having the same, for the front region of a passenger car, having an upper load path, which has upper longitudinal members and an upper crossmember, and having a lower load path, which has lower longitudinal members and a lower crossmember, wherein the lower crossmember has at least one spring element on its front side, at least over a part of its widthwise extent.

By providing the lower load path with a spring element in addition to an energy-absorbing element (or instead of an energy-absorbing element), this spring element has the effect that, in the event of a collision of the passenger car with a pedestrian, the pedestrian is deflected optimally in the direction of the hood of the passenger car. In the event of a collision, the pedestrian's torso is displaced in the direction of the hood. This inclined position of the torso is not followed to the same extent by the legs and, in particular, the lower legs of the pedestrian. The spring element creates a "rebound" according to the invention, with the result that the lower legs of the pedestrian are subjected to a force in the direction of travel of the passenger car and thus, in accordance with the inclined position of the torso, the lower legs are made to "follow suit".

It is an aspect of the invention here that the material of the spring element be selected and/or the spring element be dimensioned in terms of its geometry such that the collision-related deformation of the spring element lies at least predominantly in the range of elastic deformation, i.e. the proportion of plastic deformation is very low. As a result, the spring element initially deforms elastically under the action of a force and the spring element subsequently moves back in the direction of the initial state it had before the collision, releasing the deformation energy introduced during the force transmission into the spring element. In other words, the spring element is thus a component that ideally has only elastic properties and therefore differs fundamentally from the known energy-absorbing elements that do not contribute or do not contribute significantly to the "rebound".

According to a preferred configuration of the invention, the spring element extends substantially over the entire width of the lower crossmember. As a result, the advantageous function of the spring element is provided regardless of the point on the bumper arrangement at which the collision of the passenger car with the pedestrian occurs. The spring element can be a single continuous spring element or a plurality of spring elements.

In an advantageous development of the invention, the spring stiffness of the spring element (or of the plurality of spring elements) is irregular in the vehicle transverse direction. As a result, the "rebound" can be adapted to the collision point. As a rule, in the region of the vehicle middle, only a comparatively low rebound property of the spring element is required, since the crossmember is farthest away from its two connection points to the lower longitudinal members here and thus itself has relatively good rebound properties. Analogously, in the region of the connection to the lower longitudinal members, higher rebound properties of the spring element are advantageous.

In a preferred embodiment of the invention, the spring element has the shape of a "wave" in cross section. The term "wave" includes all cross sections that have a profile similar to a sine curve. Of course, similar cross-sectional shapes are included thereby, for example zigzag-, concertina- or bellows-like cross sections. The wave can be "a single" wave (corresponding to a sine curve over 360 degrees) or a part thereof or can be a plurality of waves arranged next to one another in a row in the vehicle longitudinal direction. Advantageously from a manufacturing point of view, the spring element can be embodied in one piece.

In the event of a collision, the wave-like spring element is compressed. In other words, with the aid of a tangent that is applied to the wave crest and/or to the wave trough of the spring element: in the event of a collision, the absolute magnitude of the gradient of this tangent increases. In extreme cases, adjacent wave flanks can come into contact with one another in the process. Once the force action ceases, the wave-like spring element extends again, releasing the previously introduced deformation energy.

In one configuration of the invention, the spring element is in the form of a (virtually) complete wave, as a sine curve over about 360 degrees. As a result, sufficient deformation travel is available with stiffness of the spring element simultaneously being ensured.

In one development of the invention, the stiffness of the spring element can be influenced by the introduction of one or more stiffening elements. The at least one stiffening element is preferably formed in a two-dimensional manner and arranged approximately in an X-Z plane of the passenger car. The term "X-Z plane" also includes orientations that differ somewhat therefrom on account of a curved profile of the lower crossmember in its lateral portions.

In order to increase the rebound of the spring element, in one configuration of the invention, the spring element is arranged on the crossmember in a pretensioned manner, wherein a device is provided that releases the stored energy in the event of a collision. In this way, the advantageous action of the spring element is enhanced.

The device can release the spring energy for example under sensor control in the case of correspondingly large acting forces and/or accelerations, for example by way of a blocking pin that is electromagnetically displaceable into a release position.

In an advantageous configuration of the invention, the spring element can have, on its side facing away from the direction of travel, a device for connecting to the lower crossmember in a form-fitting manner. The form fit can be created during the assembly of the spring element, preferably during or after the application of pretension to the spring element. In the event of a collision, the form fit is undone and the originally introduced energy released. The described embodiment is very cost-effective and is characterized by particularly high functional reliability.

A passenger car having a bumper arrangement according to the invention is also disclosed.

All location information (for example front, rear) used herein relates to the direction of travel of the passenger car when traveling forward.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
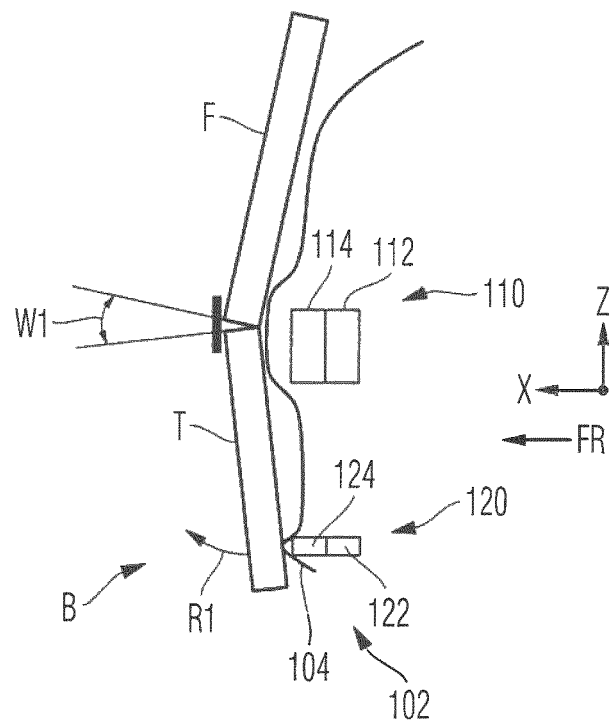
FIG. 1 is a schematic illustration of a bumper arrangement in longitudinal section, according to the prior art.

In the drawing, the direction of travel is labeled FR and a coordinate system with the spatial directions X (vehicle longitudinal direction), Y (vehicle transverse direction) and Z (vehicle vertical axis) is indicated. The X direction extends parallel to the direction of travel FR.

FIG. 1 shows the front region of a passenger car having a bumper arrangement 102 according to the prior art. The known bumper arrangement 102 has an upper and a lower load path 110 and 120, respectively, with an upper and a lower crossmember 112 and 122, respectively. The bumper arrangement 102 is covered by a front cover 104. Provided on the front side of the upper crossmember 112 is a cushion 114 made of energy-reducing absorbent foam. The lower crossmember 122 also has at the front an energy-absorbing cushion or insert 124. This can be for example a foam material or a cushion with a plastically deformable rib structure.

FIG. 1 simulates a collision situation of the passenger car with a pedestrian, using a legform impactor B, for example what is known as a FLEX-PLI ("Flexible Pedestrian Legform Impactor"). The legform impactor B symbolizes a pedestrian who is looking transversely to the direction of travel FR. Illustrated on the legform impactor B is a medial collateral ligament MCL and an opening angle W1 between the lower leg T and thigh F. The arrow R1 describes the amount of displacement of the lower leg T after impacting the front cover 102 in the region of the lower crossmember 112. Because of the plastic deformation of the energy-absorbing cushion 124, the lower leg T is not appreciably displaced in the same direction of rotation as the thigh F. As a result, a comparatively large opening angle W1 arises at the knee and thus a comparatively great extension of the medial collateral ligament MCL.

Figure 2:
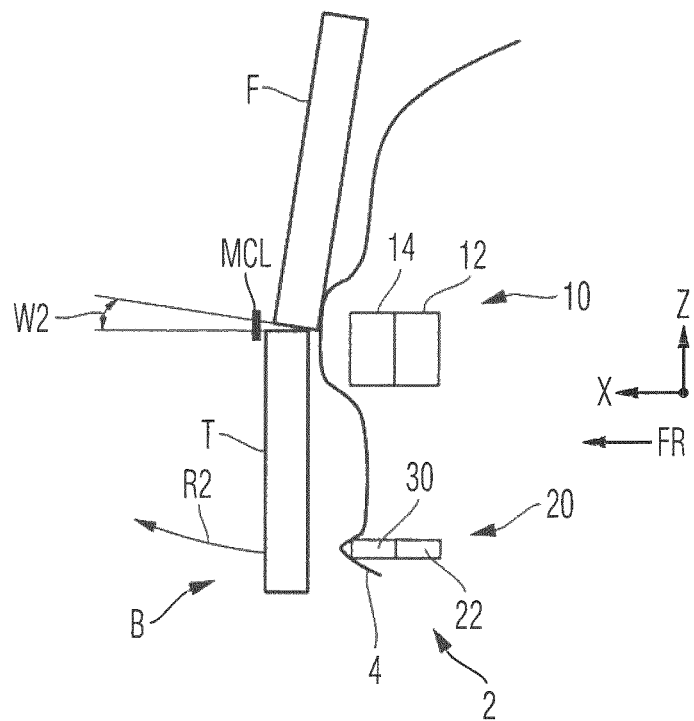
FIG. 2 is a schematic illustration, corresponding to FIG. 1, of an embodiment of the invention.

FIG. 2 shows a front region according to the invention of a passenger car having a bumper arrangement 2, with an upper and a lower load path 10 and 20, respectively, and with an upper and a lower crossmember 12 and 22, respectively. The bumper arrangement 2 is covered by a front cover 4. Provided on the front side of the upper crossmember 12 is a cushion 14 made of an energy-reducing absorbent foam. According to the invention, a spring element 30 is arranged on the front side of the lower crossmember 22.

FIG. 2 also illustrates a simulated collision situation of the passenger car with a pedestrian, using a legform impactor B. In contrast to the collision situation in FIG. 1, however, the lower crossmember 22 with the spring element 30 generates a force in the direction of travel FR, which causes the lower leg T to be displaced forward (in the direction of travel FR). This displacement is symbolized by an arrow R2. With the enhanced "rebound" of the bumper arrangement 2, the lower leg T follows the movement of a pedestrian's torso (not simulated on the legform impactor B) in the direction of the hood of the passenger car in the event of an actual collision. Thus, the opening angle W2 is smaller than in an equivalent collision situation with a bumper arrangement 102 according to the prior art, with less extension of the medial collateral ligament MCL.

Figure 3:
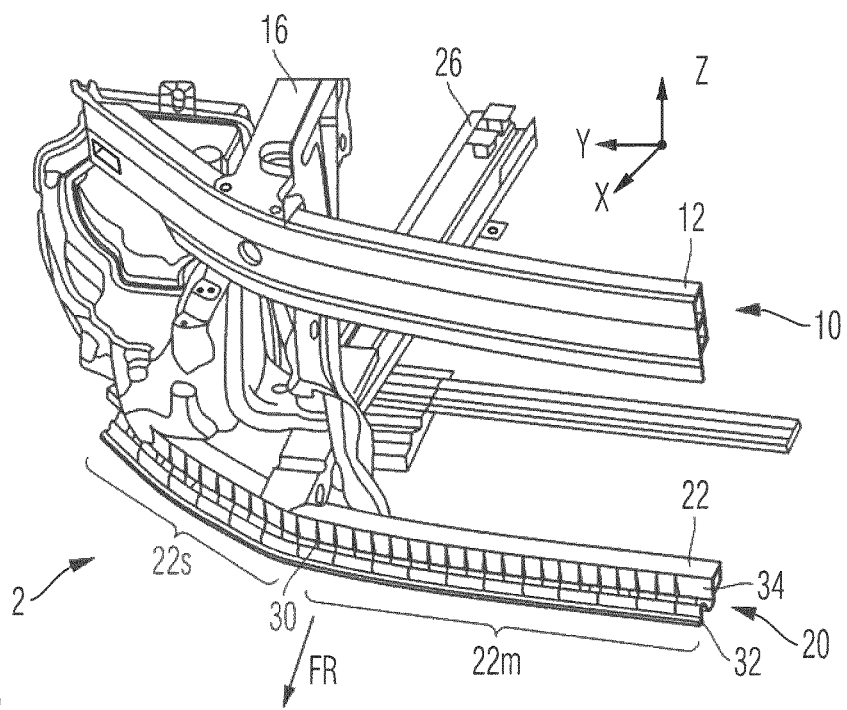
FIG. 3 is a perspective view of a bumper arrangement according to the embodiment of the invention.

FIG. 3 shows the incorporation of a bumper arrangement 2 in a front region of a passenger car. Here, only the right-hand front region of the passenger car is illustrated. Identical components are designated by the same reference numerals as in FIG. 2.

The upper load path 10 is formed by upper longitudinal members 16 (of which only the right-hand upper longitudinal member 16 is illustrated) and the upper crossmember 12. The lower load path 20 is formed by lower longitudinal members 26 (of which only the right-hand lower longitudinal member 26 is illustrated) and the lower crossmember 22. At the front side of the lower crossmember 22, the spring element 30 is provided, which extends across the entire width of the lower crossmember 22 (in FIG. 3, only the right-hand half, extending to the vehicle middle, of the crossmember 22 is illustrated). The spring element 30 is provided over the entire widthwise extent of the crossmember 22, i.e. both in the central portion 22m and at the lateral portions 22s, angled slightly to the rear counter to the direction of travel FR, of the lower crossmember 22.

The spring element 30 is wavy in cross section and has—with regard to the direction of travel FR—more or less the shape of a "lying S". Located on its front side is an approximately horizontally protruding bar 32. On its rear side, the spring element 30 has a flange 34 extending approximately in a Y-Z plane of the passenger car in an installed position, said flange 34 serving for connecting to the front side 23 of the lower crossmember 22.

Figure 4:
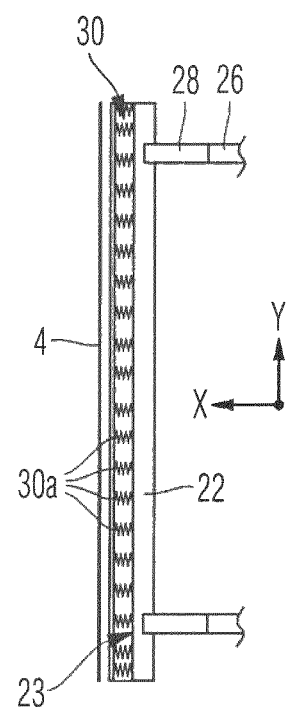
FIG. 4 is a schematic illustration of the embodiment of the invention in plan view.

FIG. 4 shows the lower crossmember 22 in a schematic illustration in plan view. Arranged on the front side 23 of the lower crossmember 22 is the spring element 30, which extends across the entire width of the lower crossmember 22. In order to make it clear that the elastic properties of the spring element 30 can vary across the width of the lower crossmember 22, "the spring element 30" is illustrated in FIG. 4 as a plurality of individual spring elements 30a, which are arranged at sometimes different distances from one another and/or which can have different spring rates. The lower crossmember 22 is connected to the lower longitudinal members 26 via deformation elements 28, known as "defoboxes", which reduce kinetic energy by plastic deformation in the event of a collision.

Figure 5:
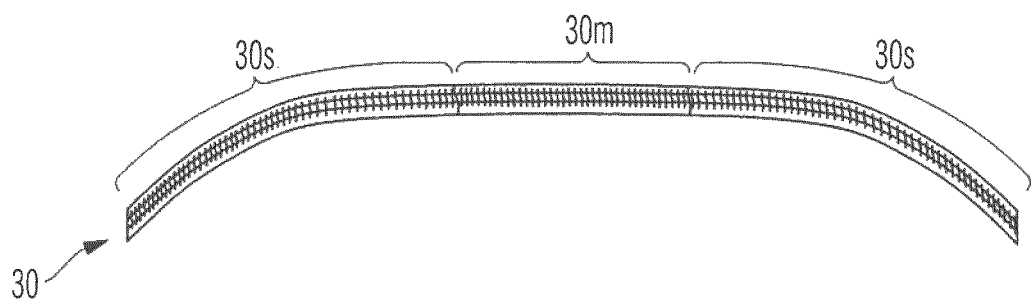
FIG. 5 is a further schematic illustration of the embodiment of the invention in plan view.

FIG. 5 illustrates once again the possibility of varying the elastic properties of the spring element 30 over the widthwise extent of the lower crossmember 22. For example, the spring element 30 can have a lower spring rate in its central portion 30m that in its lateral portions 30s. This design can be chosen for example when the lower crossmember 22 has higher elasticity in its central portion 22m than in its lateral portions 22s adjacent to the connection points to the lower longitudinal members 26.

Figure 6:
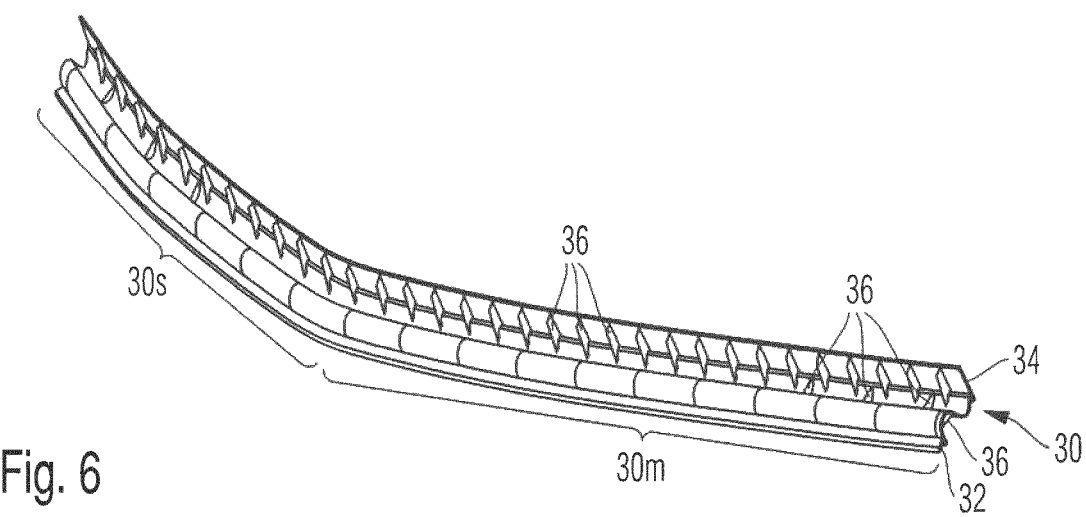
FIG. 6 is a schematic perspective illustration of an exemplary embodiment of the invention.
Figure 7:
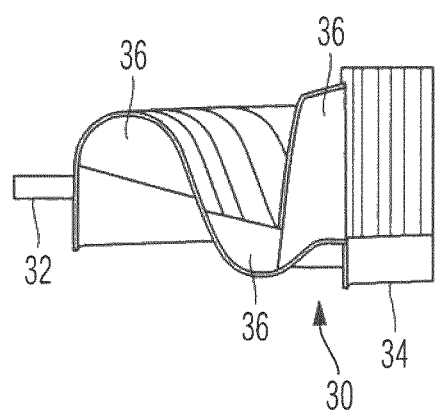
FIG. 7 is a schematic sectional illustration of the subject matter of FIG. 6.

FIGS. 6 and 7 show an exemplary embodiment of a spring element 30 reaching over the width of the lower crossmember 22 (not illustrated), wherein, in FIG. 6, only the right-hand half of the spring element 30 is illustrated. The spring element 30 is wavy in cross section, with approximately a complete wave similar to the profile of a sine curve over an angular range of 360 degrees. As already mentioned in conjunction with FIG. 3, the cross section of the spring element 30 could also be clearly described as a "lying S". The stiffness and/or the spring rate of the spring element 30 can advantageously be influenced by the provision of rib-like stiffening elements 36. The stiffening elements 36 are formed in a two-dimensional manner and extend, in the central portion 30m of the spring element 30, approximately parallel to an X-Z plane of the passenger car. In the lateral portions 30s (in the present case only the right-hand lateral portion 30s is illustrated), the orientation of the stiffening elements 32 deviates somewhat from the X-Z plane and is oriented with the curvature of the crossmember 22 in its laterally external portion 22s.

As is apparent in particular from the enlarged illustration in FIG. 7, the stiffening elements 36 can be arranged at different positions of the spring element 30. Here, FIG. 7 illustrates in principle that the stiffening elements 36 can stiffen the "wave arc", i.e. the "wave crest" and/or the "wave trough", and/or the flange 34. In contrast to the schematic illustration in FIG. 7, the stiffening elements 36 can also fill only a part of the wave crest and/or of the wave trough of the spring element 30.

The stiffening elements 36 can be arranged over the widthwise extent of the spring element 30 at identical or different distances from one another. Thus, in FIG. 6, an equidistant arrangement of the stiffening elements 36, which stiffen the flange, is illustrated. While the stiffening elements 36 (for stiffening the flange 34) are located over the entire widthwise extent of the spring element 30, the stiffening elements 36 (for stiffening the "wave troughs") are provided only in the lateral portions 30s and in the central portion 30m of the spring element 30.

Figure 8:
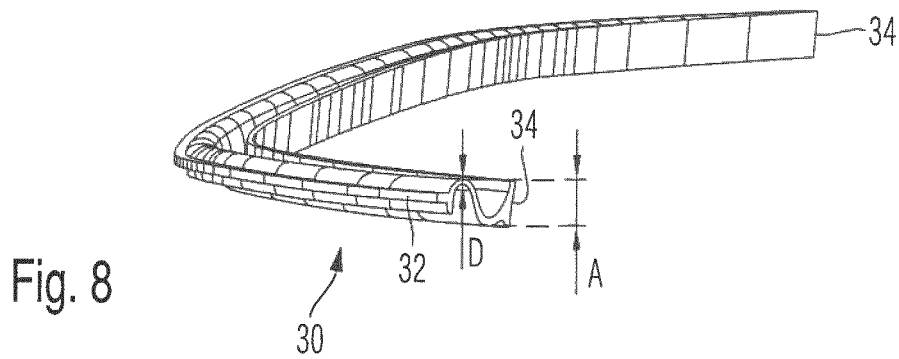
FIGS. 8 to 10 are schematic perspective illustrations of further exemplary embodiments of the invention.
Figure 9:
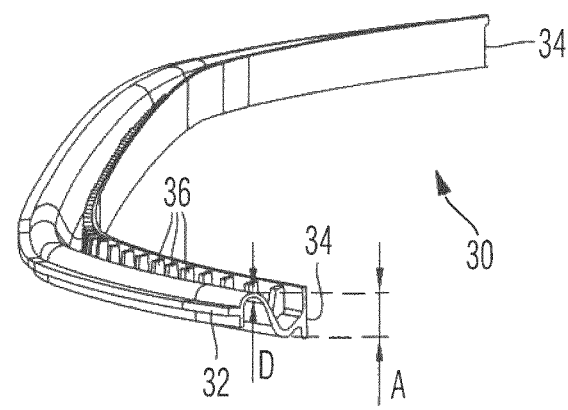
Figure 10:
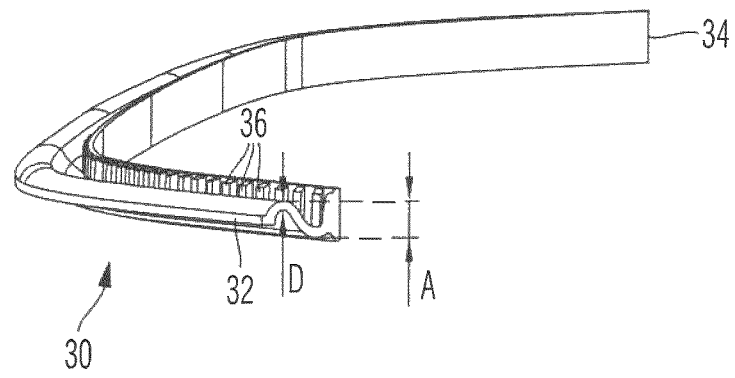
Figure 11:
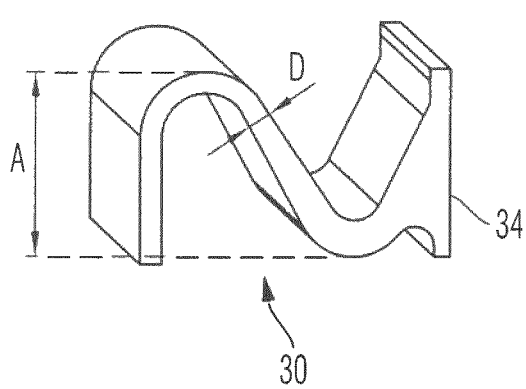
FIGS. 11 to 15 are schematic illustrations of various exemplary embodiments of spring elements.

FIGS. 8 to 10 show different embodiments of spring elements 30. A common feature of all embodiments is a wavy cross section of the spring element 30. The individual spring elements 30 have wavy cross sections of different "height" ("amplitude" A) and also different wall thicknesses D, however. Provided on the spring elements 30 according to FIGS. 9 and 10 are stiffening elements 36, which are each positioned on the flange 34 of the spring elements 30.

Figure 12:
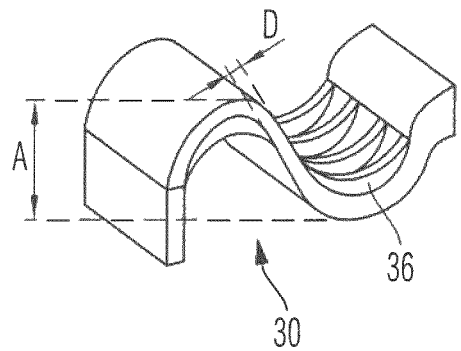
Figure 13:
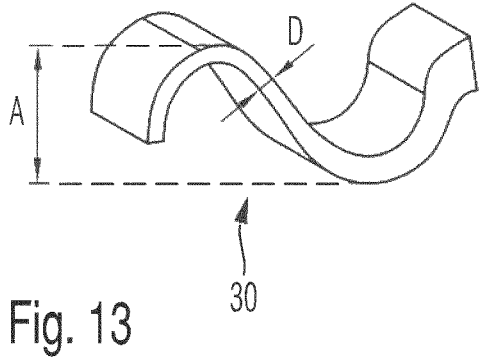
Figure 14:
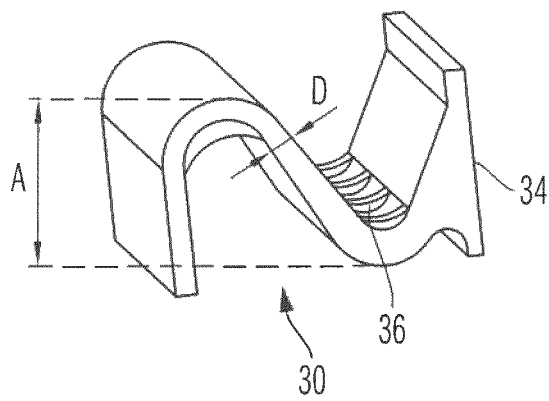
Figure 15:
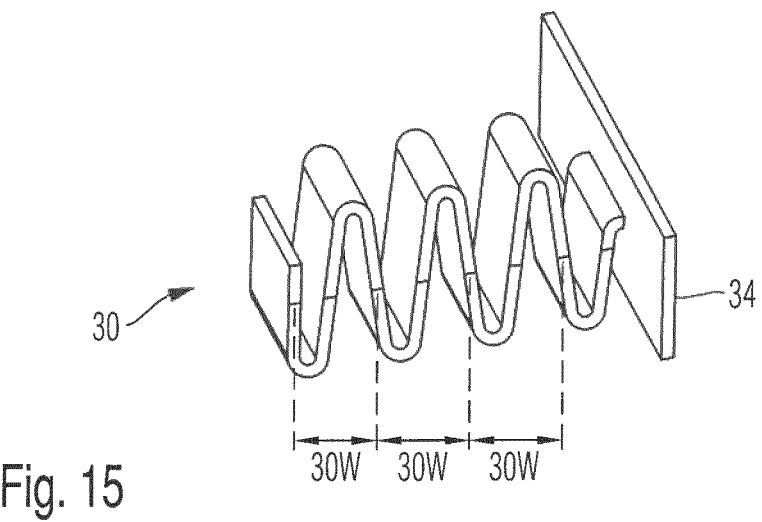

FIGS. 11 to 15 show details of different embodiments of spring elements 30 in schematic illustrations. As already explained in conjunction with FIGS. 8 to 10, the individual spring elements 30 have wavy cross sections of different "height" ("amplitude" A) and also different wall thicknesses D. The spring elements 30 according to FIGS. 12 and 14 are in this case provided with differently configured stiffening elements 36. In FIG. 15, a spring element 30 having a plurality of successive "waves" 30w is schematically illustrated, while the spring elements 30 according to FIGS. 11 to 14 each have approximately only one complete wave.

Figure 16:
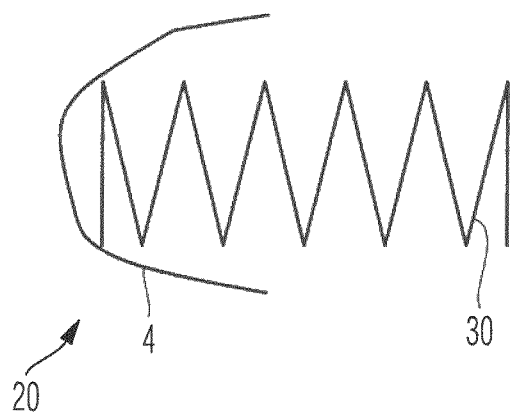
FIG. 16 is a schematic sectional illustration of a spring element and an associated front cover.
Figure 17:
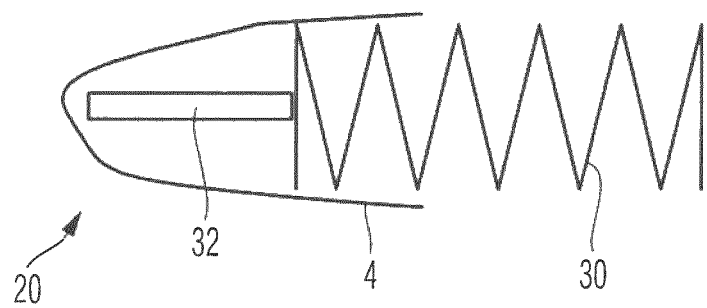
FIG. 17 is an illustration, corresponding to FIG. 16, of a further embodiment of the invention.

In FIGS. 16 and 17, the interaction between differently configured front covers 4, which cover the lower load path 20, and the spring element 30 is illustrated by way of example. In the case of a "blunt" design of the front cover 4 according to FIG. 16, the spring element 30 can be drawn right into the front region of the front cover 4. This is not possible in the case of a "pointed" design of the front cover 4 according to FIG. 17, however: here, the spring element 30, with its spring geometry, cannot be drawn right up to the front edge of the front cover 4. In order, nevertheless, to apply the collision energy to the spring element 30 as far as possible from the start of the collision with a pedestrian, a bar 32 is provided, which bridges the clearance in the X direction, such that the impact energy from the collision can be introduced into the spring element 30 earlier. As a result, the "rebound" is much improved.

During the collision with a legform impactor or in actual accidents involving the legs of a pedestrian, the front cover 4 is subjected to force in a comparatively pointwise manner and transfers this force to the spring element 30 arranged therebehind. Depending on the design of the bar 32 at the front side of the spring element 30, the load distribution in the vehicle transverse direction Y can be influenced. In the case of a bar 32 extending over a relatively large proportion of the width of the passenger car, said bar 32 acts as it were as a stiffening rib, by way of which the pointwise energy introduction is introduced extensively into the spring element 30. In other words—as seen in the vehicle transverse direction Y—a relatively large proportion of the spring element 30 is subjected to energy, this being equivalent to an increase in spring stiffness. In the case of a bar 32 that is interrupted in the vehicle transverse direction Y, the spring stiffness is increased less or not noticeably, depending on the width of the individual portions of the bar 32.

FIGS. 18A to 18D show a spring element 30 that can be attached to a lower crossmember 22 in a pretensioned manner. This spring element 30 is partially uncoupled from the crossmember 22 in the event of a collision, releasing the previously stored spring energy.

The elasticity of the spring element 30 is created by its resilient portion 31. The resilient portion 31 has walls 33 that are arranged in an approximately zigzag-shaped manner in cross section. The walls 33 form a "complete wavelength" analogous to a complete sine wave, having a length L1 in the relaxed state.

Provided on a front wall 40 of the spring element 30 is a chamber 38, the rounded external contour of which is adapted to the internal contour of the front cover 4. By way of the chamber 38, the stiffness of the spring element 30 is increased. This is significant for example in the case of a height offset between the front edge of the front cover 4 as contact point in the lower load path 20, for the one part, and the crossmember 22, for the other part. Such an offset in the vertical direction Z of the passenger car causes in principle twisting of the spring element 30 upward or downward. As a result, the "rebound" is weakened, since it no longer takes place ideally virtually parallel to the longitudinal direction X of the passenger car. As a result of the stiffening of the spring element 30, the latter twists less with respect to the crossmember 22. The chamber 38 can be dispensed with or be embodied in a less stiff manner, depending on the vertical position of the lower load path 20.

Figure 18A:
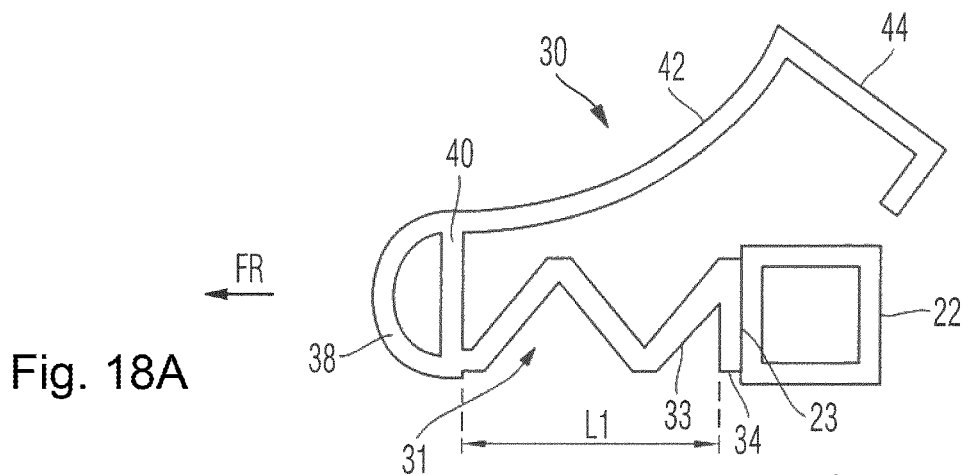
FIGS. 18A to 18D are schematic sectional illustrations of a spring element on a lower crossmember, in various positions of the spring element.

By way of its flange 34, the spring element 30 is supported on the front side 23 of a lower crossmember 22. Arranged on the front wall 40 of the spring element 30 is a freely projecting arm 42 having a hook 44 at its end. The arm 42 is internally pretensioned and projects upward (FIG. 18A).

Figure 18B:
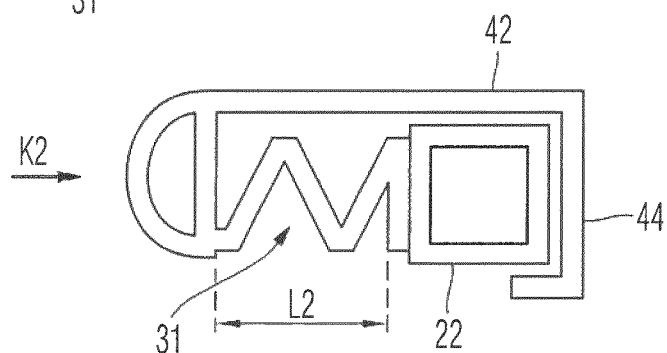
Figure 18C:
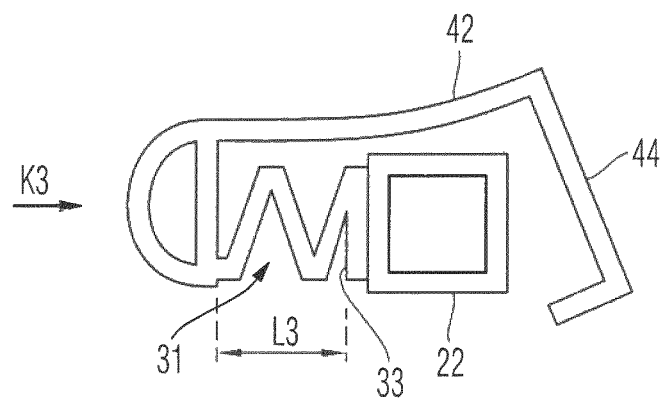
Figure 18D:
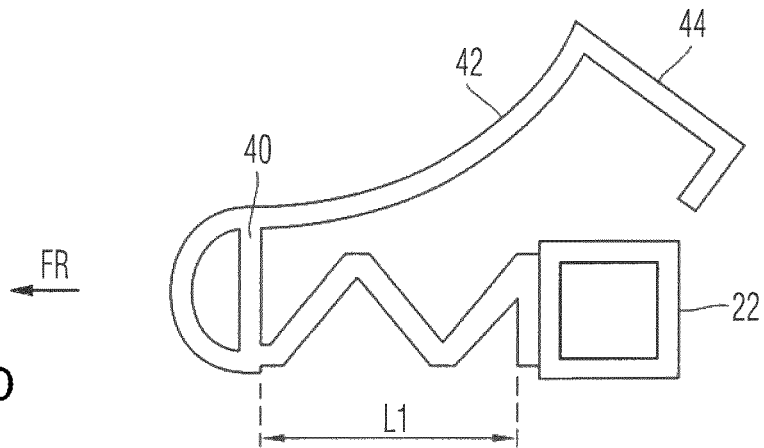

The spring element 30 is fastened to the lower crossmember 22 in that the flange 34 is brought into contact with the front side 23 of the lower crossmember 22. Subsequently, the resilient portion 31 of the spring element 30 is compressed in the direction of the arrow K2 until, with the associated pushing down of the arm 42, the hook 44 engages around the crossmember 22 and forms, in this position, a secure form fit with the crossmember 22. In this compressed state, the resilient portion 31 of the spring element 30 has a length L2 and is pretensioned (FIG. 18B). If a sufficiently large force now acts on the lower load path 20 (arrow K3), the resilient portion 31 is compressed further, to a length L3 in which the walls 33 of the resilient portion 31 virtually form a solid block. As a result of the associated displacement of the arm 42 upward, the hook 44 is released from the form fit with the crossmember 22 (FIG. 18C). As a result, the pretensioned resilient portion 31 displaces the front wall 40 of the spring element 30 in the direction of travel FR (FIG. 18D) and returns to the initial state illustrated in FIG. 18A. As a result of the movement of the spring element 30 in the direction of travel FR, an additional force is exerted on the legform impactor B illustrated in FIG. 2, with the advantage of a larger impulse on the lower leg T of the legform impactor B. On account of this improved "rebound", the opening angle W2 can be reduced.

The invention can be summarized as follows: a bumper arrangement 2 of a passenger car has an upper and a lower load path 10 and 20, respectively. Provided according to the invention on the crossmember 22 of the lower load path is a spring element 30, which, in the event of a collision of a pedestrian with the passenger car, exerts an additional force on the pedestrian's lower leg T in order to support the movement of the pedestrian in the direction of the hood of the passenger car.

LIST OF REFERENCE SIGNS

2 Bumper arrangement
4 Front cover
10 Upper load path
12 Upper crossmember
14 Cushion
16 Upper longitudinal member
20 Lower load path
22 Lower crossmember
22m Central portion
22s Lateral portion
23 Front side
24 Cushion
26 Lower longitudinal member
28 Deformation element
30 Spring element
30a Individual spring elements
30m Central portion
30s Lateral portion
30w Wave
31 Resilient portion
32 Bar
33 Wall
34 Flange
36 Stiffening element
38 Chamber
40 Front wall
42 Arm
44 Hook
102 Bumper arrangement
104 Front cover
110 Upper load path
112 Upper crossmember
114 Cushion
120 Lower load path
122 Lower crossmember
124 Cushion
A Amplitude
B Legform impactor
D Wall thickness
F Thigh
FR Direction of travel
K2 Arrow
K3 Arrow
L1 Length
L2 Length
L3 Length
MCL Medial collateral ligament
R1 Arrow
R2 Arrow
T Lower leg
W1 Opening angle
W2 Opening angle
X, Y, Z Spatial direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A bumper arrangement for a front region of a passenger car, comprising:
an upper load path having upper longitudinal members and an upper crossmember;
a lower load path having lower longitudinal members and a lower crossmember; and at least one spring element arranged on a front side of the lower crossmember over at least a portion of a widthwise extent of the lower crossmember, wherein the at least one spring element comprises a material and/or is dimensioned such that collision-related deformation of the spring element lies at least predominantly in a range of elastic deformation, whereby a rebound effect exerts an additional force on a pedestrian causing the collision-related deformation.

2. The bumper arrangement according to claim 1, wherein the spring element is provided substantially over the entire widthwise extent of the lower crossmember.

3. The bumper arrangement according to claim 2, wherein a spring stiffness of the spring element is at least regionally different over the widthwise extent of the lower crossmember.

4. The bumper arrangement according to claim 1, wherein the spring element is formed in a wavy manner in a cross section defined approximately in an X-Z plane of the passenger car.

5. The bumper arrangement according to claim 4, wherein the spring element exhibits substantially a complete wave with a profile similar to a sine curve.

6. The bumper arrangement according to claim 1, wherein the spring element has at least one stiffening element oriented approximately in a direction of travel of the passenger car.

7. The bumper arrangement according to claim 6, wherein the at least one stiffening element is formed in a two-dimensional manner, extends approximately in an X-Z plane of the passenger car, and is inserted in a wave arc of the spring element.

8. A bumper arrangement for a front region of a passenger car, comprising:
   an upper load path having upper longitudinal members and an upper crossmember;
   a lower load path having lower longitudinal members and a lower crossmember; and
   at least one spring element arranged on a front side of the lower crossmember over at least a portion of a widthwise extent of the lower crossmember, wherein
   the spring element is arranged on the lower crossmember in a pretensioned state, and
   a device is provided that releases the pretension of the spring element in the event of a collision, such that the spring element generates a force directed in the direction of travel.

9. The bumper arrangement according to claim 8, wherein the device has a portion that is in a form fit with the crossmember when the spring element is pretensioned, and
in the event of a force acting counter to the direction of travel, the form fit is undone and the spring element releases the pretension.

10. A passenger car comprising a bumper arrangement according to claim 1.

11. The passenger car according to 10, wherein the spring element is provided substantially over the entire widthwise extent of the lower crossmember.

12. The passenger car according to 11, wherein a spring stiffness of the spring element is at least regionally different over the widthwise extent of the lower crossmember.

13. The passenger car according to 10, wherein the spring element is formed in a wavy manner in a cross section defined approximately in an X-Z plane of the passenger car.

14. The passenger car according to 13, wherein the spring element exhibits substantially a complete wave with a profile similar to a sine curve.

15. The passenger car according to 10, wherein the spring element has at least one stiffening element oriented approximately in a direction of travel of the passenger car.

16. The passenger car according to 15, wherein the at least one stiffening element is formed in a two-dimensional manner, extends approximately in an X-Z plane of the passenger car, and is inserted in a wave arc of the spring element.

17. A passenger car, comprising:
    a bumper arrangement for a front region of the passenger car, the bumper arrangement comprising:
      an upper load path having upper longitudinal members and an upper crossmember;
      a lower load path having lower longitudinal members and a lower crossmember; and
      at least one spring element arranged on a front side of the lower crossmember over at least a portion of a widthwise extent of the lower crossmember, wherein
    the spring element is arranged on the lower crossmember in a pretensioned state, and
    a device is provided that releases the pretension of the spring element in the event of a collision, such that the spring element generates a force directed in the direction of travel.

18. The passenger car according to 17, wherein the device has a portion that is in a form fit with the crossmember when the spring element is pretensioned, and
in the event of a force acting counter to the direction of travel, the form fit is undone and the spring element releases the pretension.

* * * * *